United States Patent [19]
Van Mill

[11] Patent Number: 5,156,216
[45] Date of Patent: Oct. 20, 1992

[54] CONSERVATION COMPLIANCE TILLAGE TOOL

[75] Inventor: Michael D. Van Mill, Shell Rock, Iowa

[73] Assignee: Unverferth Manufacturing Co., Inc., Kalida, Ohio

[21] Appl. No.: 688,471

[22] Filed: Apr. 22, 1991

[51] Int. Cl.⁵ ........................ A01B 63/32; A01B 35/18
[52] U.S. Cl. ................................... 172/138; 172/148; 172/178; 172/328
[58] Field of Search ............................ 172/326–328, 172/677, 680, 430, 138, 145, 148, 248, 319, 310, 140, 146, 147, 149, 151, 178, 180, 181, 382, 196, 488

[56] References Cited

U.S. PATENT DOCUMENTS

| | | |
|---|---|---|
| 1,519,776 | 12/1924 | Fazekas et al. |
| 1,814,815 | 7/1931 | Altgelt. |
| 2,037,621 | 4/1936 | Nunham .......................... 55/12 |
| 2,717,479 | 9/1955 | Scheidenhelm et al. ............ 172/328 |
| 2,780,158 | 2/1957 | Pursche ...................... 172/328 X |
| 3,224,392 | 12/1965 | Mellen ............................. 111/52 |
| 3,757,871 | 9/1973 | Maust, Jr. et al. ................ 172/178 |
| 4,227,581 | 10/1980 | Klotzbach ....................... 172/142 |
| 4,245,706 | 1/1981 | Dietrich, Sr. ................... 172/180 |
| 4,279,311 | 7/1981 | Dietrich, Sr. ................... 172/509 |
| 4,403,662 | 9/1983 | Dietrich, Sr. ................... 172/156 |
| 4,444,271 | 4/1984 | Dietrich, Sr. ................... 172/140 |
| 4,446,924 | 5/1984 | Dietrich, Sr. ................... 172/140 |
| 4,450,917 | 5/1984 | Hake .............................. 172/328 |
| 4,454,920 | 6/1984 | Dietrich, Sr. ................. 172/328 X |
| 4,492,272 | 1/1985 | Jensen ........................ 172/328 X |
| 4,535,849 | 8/1985 | Dietrich, Sr. ................... 172/468 |
| 4,538,689 | 9/1985 | Dietrich, Sr. ................... 172/700 |
| 4,542,793 | 9/1985 | Dietrich, Sr. ................... 172/180 |
| 4,601,248 | 7/1986 | Beasley ........................... 111/52 |
| 4,712,622 | 12/1987 | Birkenbach et al. ............... 172/328 |

FOREIGN PATENT DOCUMENTS

| | | | |
|---|---|---|---|
| 344298 | 11/1936 | Italy ............................ 172/196 |
| 519154 | 7/1976 | U.S.S.R. ........................ 172/148 |
| 1393328 | 5/1988 | U.S.S.R. ........................ 172/148 |
| 2062431 | 5/1981 | United Kingdom ............... 172/178 |

OTHER PUBLICATIONS

"Low Cost Depth Gauge", Best of Farm Show–1990 Edition, Dec. 1989.
"Kverneland Seed Bedder" Sales Brochure, Jan. 1983.
"Deep Tiller", Article in Farm Industry News, Nov. 1990.

Primary Examiner—Randolph A. Reese
Assistant Examiner—Jeffrey L. Thompson
Attorney, Agent, or Firm—Henderson & Sturm

[57] ABSTRACT

A conservation tillage tool including a frame disposed to support a number of soil working implements in sequence. The frame is supported by ground wheels attached to the rear section of the frame. The wheels are movable with respect to the rear section of the frame to move the frame between a raised transport position and a number of lowered working positions. A hitch attached to a tractor supports the front section of the frame, and a pivotally attached tongue interconnects the front section and the hitch. A leveling mechanism interconnects the rear section, the front section and the pivotally attached tongue. The leveling mechanism is a four-bar linkage that applies a force at the pivotal connection of the tongue to the front section as the wheels move to raise or lower the rear section thereby maintaining the frame substantially level with respect to the ground.

2 Claims, 3 Drawing Sheets

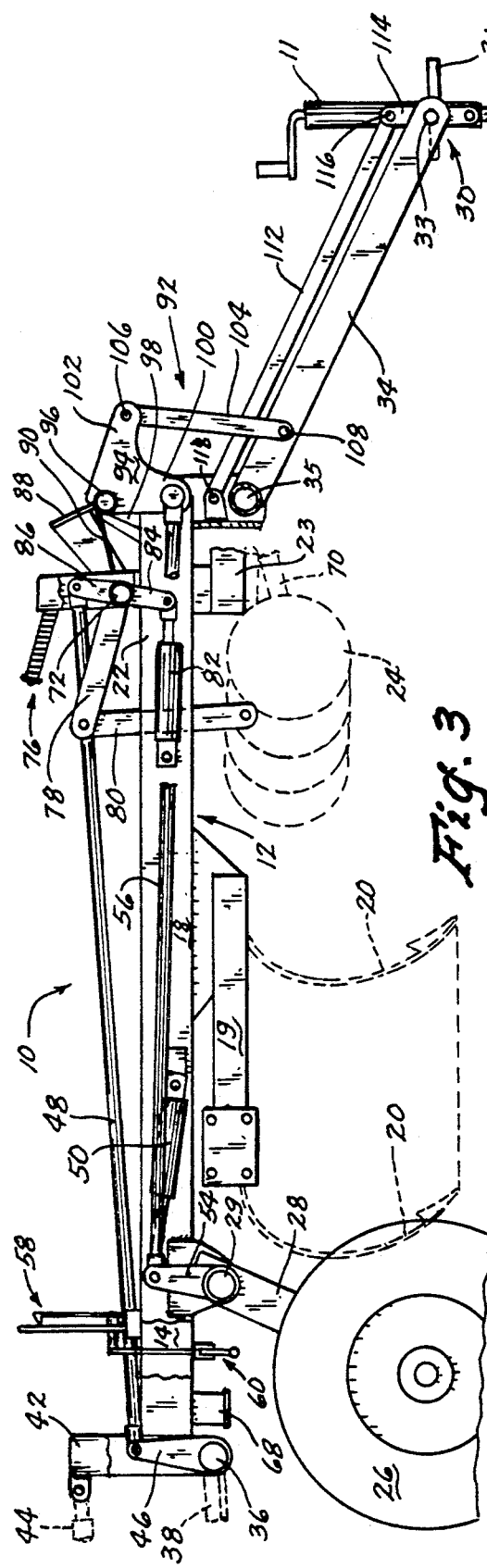
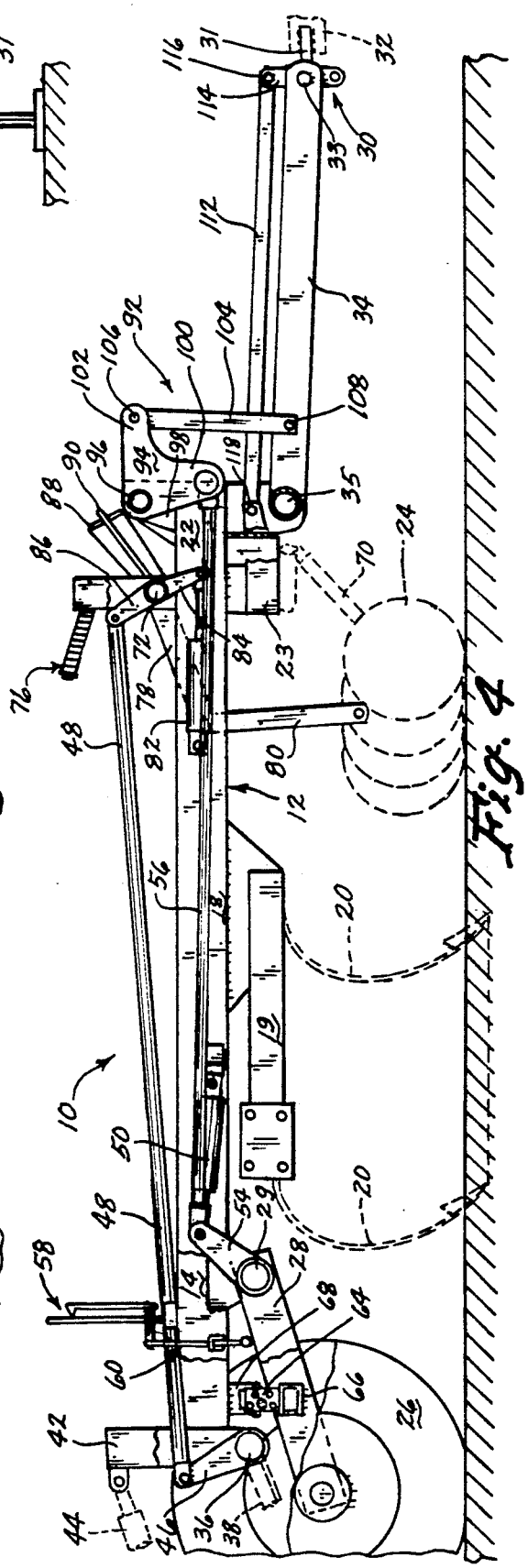

5,156,216

CONSERVATION COMPLIANCE TILLAGE TOOL

TECHNICAL FIELD

This invention relates to conservation tillage tools, and more particularly to a tillage tool having a self-leveling frame.

BACKGROUND ART

The trend toward conservation practices in agriculture has led to the utilization of no-till and conservation tillage tools. Arranging a number of different soil working implements in sequence on a single frame is a popular expedient since the goal is always to do more with less input. One problem associated with multiple implements on a single frame is the difficulty of maintaining the frame level with respect to the ground. As the working depth of the various implements is varied, as demanded by varying soil conditions, the difficulty of keeping the frame level is increased.

Those concerned with these and other problems recognize the need for an improved conservation tillage tool.

DISCLOSURE OF THE INVENTION

The present invention provides a conservation tillage tool including a frame disposed to support a number of soil working implements in sequence. The frame is supported by ground wheels attached to the rear section of the frame. The wheels are movable with respect to the rear section of the frame to move the frame between a raised transport position and a number of lowered working positions. A hitch attached to a tractor supports the front section of the frame, and a pivotally attached tongue interconnects the front section and the hitch. A leveling mechanism interconnects the rear section, the front section and the pivotally attached tongue. The leveling mechanism is a four-bar linkage that applies a force at the pivotal connection of the tongue to the front section as the wheels move to raise or lower the rear section thereby maintaining the frame substantially level with respect to the ground.

An object of the present invention is the provision of an improved conservation tillage tool.

Another object is to provide a conservation tillage tool having a self-leveling frame.

A further object of the invention is the provision of a conservation tillage tool that effectively cuts fall residue, penetrates compacted soil, and levels and covers uneven soil with residue in a single pass.

Still another object is to provide a conservation tillage tool that effectively controls the amount of remaining residue to meet conservation compliance program criteria and ready the field for a spring pass.

A still further object of the present invention is the provision of a conservation tillage tool having a self-leveling hitch.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 3 is a side elevational view similar to FIG. 1 but having portions cut away to show the frame leveling mechanism and the control mechanism for simultaneously raising and lowering the implements carried on the front section and rear section of the frame;

FIG. 4 is a side elevational view similar to FIG. 3 but showing the frame in a lowered working position;

BEST MODE FOR CARRYING OUT THE INVENTION

Figure 1:
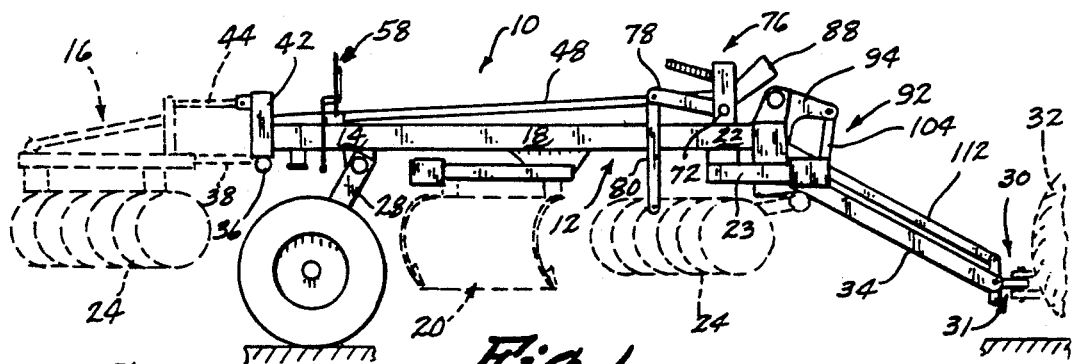
FIG. 1 is a side elevational view of the conservation tillage tool of the present invention showing the frame in the raised transport position attached to a tractor.
Figure 5:
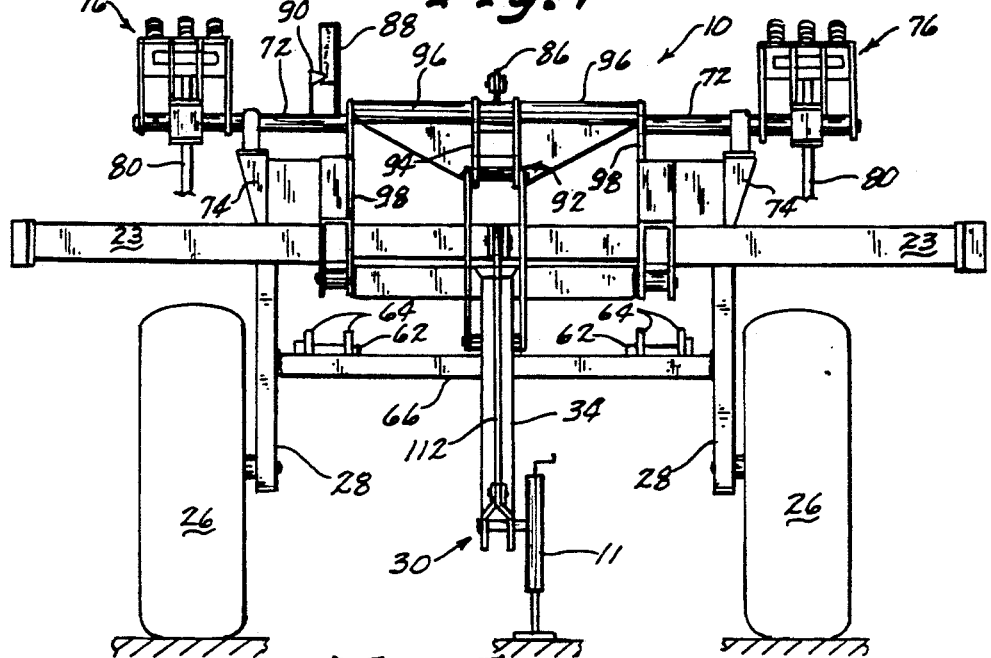
FIG. 5 is a front elevational view.

Referring now to the drawings wherein like reference numerals designate identical or corresponding parts through the several views, FIG. 1 shows the conservation tillage tool (10) of the present invention. The tillage tool (10) includes a frame (12) having a rear section (14) disposed to carry an implement such as a row of residue mixing discs (16), an intermediate section (18) carrying an implement such as V-shank deep tillage points (20), and a front section (22) disposed to carry an implement such as a row of disc gangs (24).

A pair of ground wheels (26) are movably attached to the rear section (14) of the frame (12) by standards (28) attached by a rockshaft (29) carried on the frame (12). The wheels (26) are movable with respect to the rear section (14) to move the frame between a raised transport or storage position, as shown in FIGS. 1-3 and 5-6, and a lowered working position as shown in FIG. 4.

The front section (22) of the frame (12) is supported by a hitch (30) attached to a tractor (32). A tongue (34) is pivotally attached to the front section (22) by pivotal connection (35) and is connected to the hitch (30) by a pivotal connection (33). A forwardly extending plate (31) is adapted to be attached to the drawbar of a tractor (32). A conventional screw jack (11) may be used to support the hitch (30) when the tillage tool (10) is in the storage mode.

Figure 6:
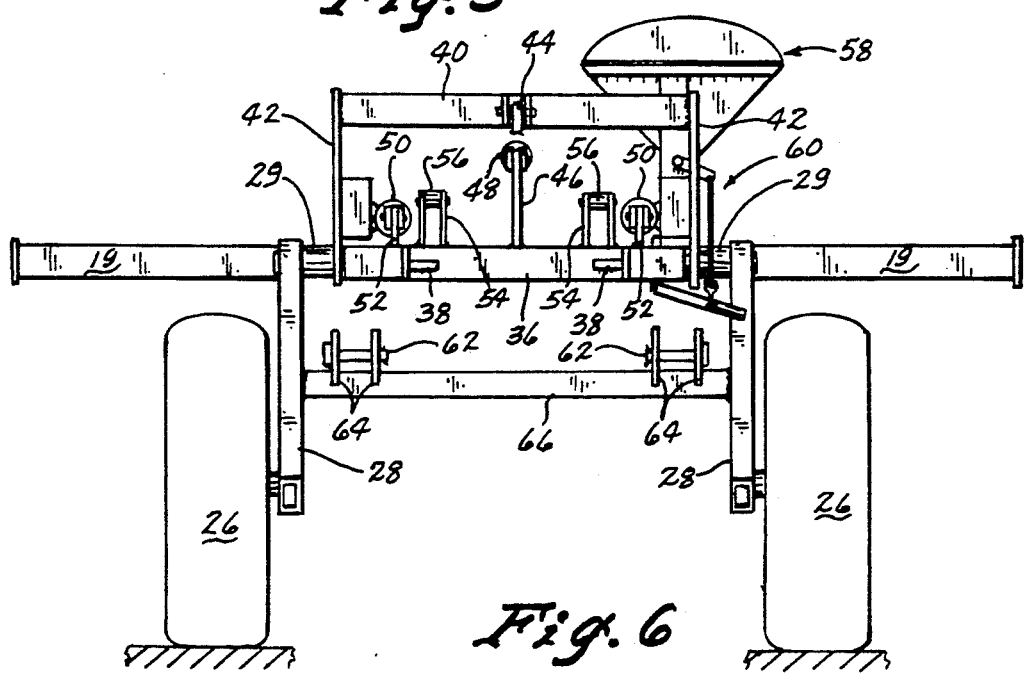
FIG. 6 is a rear elevational view.
Figure 2:
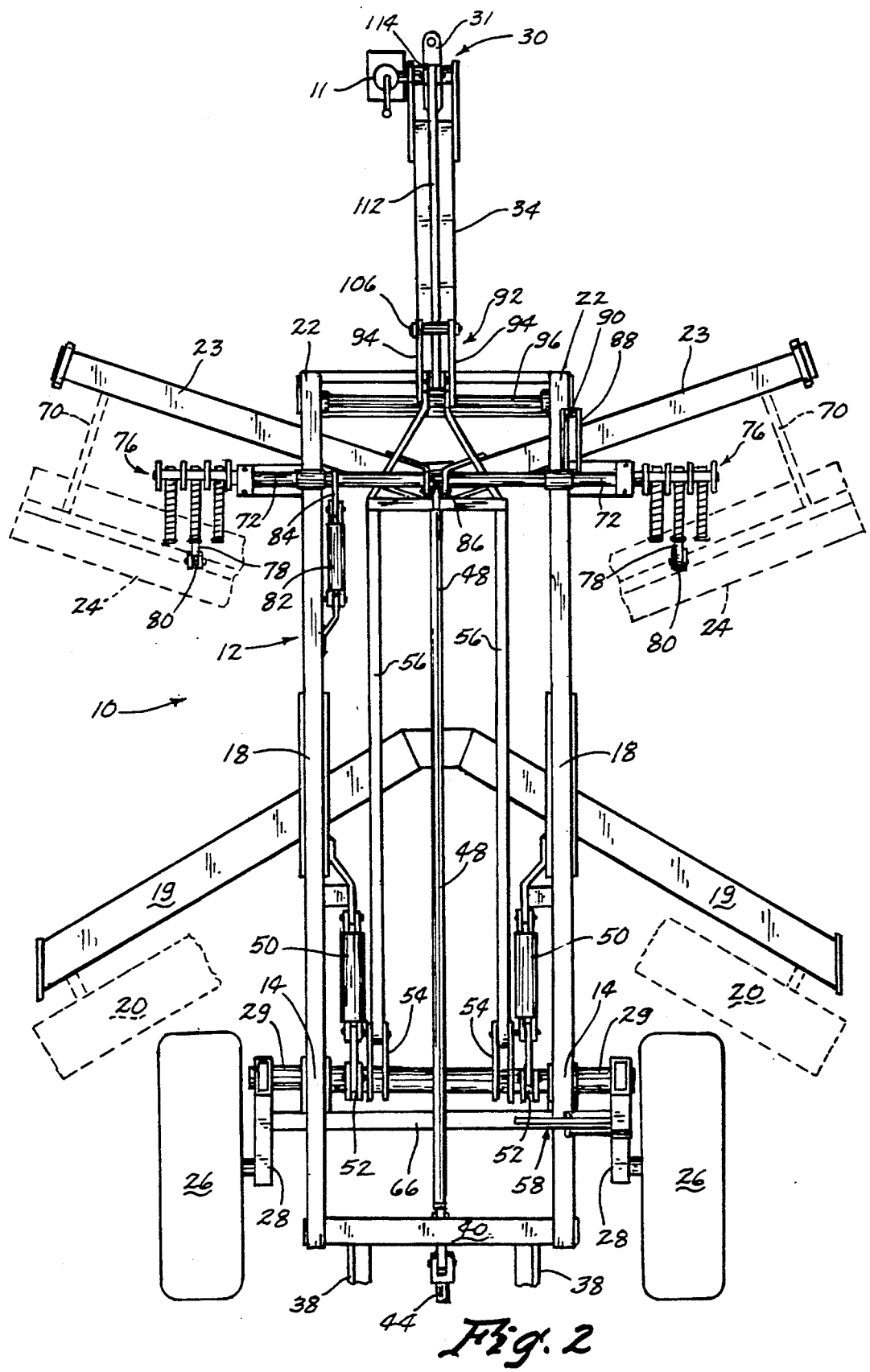
FIG. 2 is an enlarged top plan view thereof, but showing the tongue supported on a screw jack.

As best shown by reference to FIGS. 2 and 6, a rockshaft (36) is carried at the extreme rear of rear section (14) and supports a pair of rearwardly extending lifting arms (38). A cross beam (40) is supported above the rockshaft (36) by columns (42), and a stabilizer arm (44) extends rearwardly from the cross beam (40) above the lifting arms (38). The lifting arms (38) and the stabilizer arm (44) form a three-point hitch that supports the row of residue mixing discs (16). A lever arm (46) extends up from the rockshaft (36) and is attached to a connecting link (48) that extends forward to the operating mechanism for the row of disc gangs (24).

Referring now to FIG. 2, it can be seen that the wheels (26) are moved by selective activation of the hydraulic cylinders (50) attached to lever arms (52) extending up from the rockshaft (29). Yokes (54) also extend radially out from the rockshaft (29) and attach to connecting rods (56) that extend forwardly to the leveling mechanism (92).

A rear sweeping wing beam (19) is rigidly attached to an extends from the intermediate section (18) of the frame (12) to support the deep tillage points (20). The working depth of the tillage points (20) is therefore determined by the height of the frame (12) above the ground to be worked. A working depth indicator (58) extends up from the rear section (14) and is visible to the tractor operator. The indicator includes a mechanical linkage (60) activated as the wheel standard (28) is raised toward the frame (12) when the hydraulic cylinders (50) are retracted to lower the frame (12) to the desired working height (FIGS. 3 and 4). The lowermost position of the frame (12) may be selectively adjusted by positioning pins (62) within registered openings in the yokes (64) carried on the cross beam (66) that interconnects the wheel standards (28). Stops (68) extend down from the rear section (14) to engage the pins (62) to stop further lowering of the frame (12) with respect to the ground.

A forward sweeping wing beam (23) is rigidly attached to and extends from the front section (22) of the frame (12). Stabilizer bars (70) extend between the wing beam (23) and the disc gangs (24). As best shown in FIGS. 2-5, a rockshaft (72) is supported by columns (74) extending up from the front section (22). The ends of the rockshaft (72) carry spring biased trip mechanisms (76) which support rearwardly extending lift arms (78). Lifting links (80) interconnect the lift arms (78) and the disc gangs (24).

The rockshaft (72) is moved and the disc gangs (24) are raised or lowered by selective activation of the hydraulic cylinder (82) attached to the lever arm (84) extending down from the rockshaft (72). The lever arm (86) extends radially upward from the center of the rockshaft (72) and attaches to the connecting link (48) that extends back to the lever arm (46) attached to the rockshaft (36). Thus, as the hydraulic cylinder (82) is extended or retracted, the row of disc gangs (24) and the row of residue mixing discs (16) are simultaneously lowered or raised. The working depth of the disc gangs (24) and mixing discs (16) are visually indicated to the tractor operator by the gauge face (88) attached to the front section (22) of the frame (12) and the pointer (90) attached to the rockshaft (72).

Referring now to FIGS. 3 and 4, it can be seen that the leveling mechanism (92) includes a cam (94) attached to the rockshaft (96) supported above the front section (22) of the frame (12) on columns (98). The cam (94) includes a lower lobe (100) pivotally attached to the connecting rod (56) and a forward lobe (102) pivotally attached to a bar (104). The bar (104) pivotally interconnects the forward lobe (102) and the tongue (34) at pivotal connection points (106) and (108), respectively. A four-bar linkage is thus formed with pivots at the pivotal connection (35), the rockshaft (96), and the connection points (106) and (108).

As the wheels (26) are moved by the hydraulic cylinders (50) to raise or lower the rear section (14), a force is applied at the pivotal connection (35) of the tongue (34) which acts to maintain the front section (22) substantially level with the rear section (14) of the frame (12). For example, when moving from the lowered working position (FIG. 4) to a raised position (FIG. 3), the cylinders (50) are extended to lower the wheels (26) and raise the frame (12) with respect to the ground. As this occurs, the connecting rods (56) pull back on the lower lobe (100) of the cam (94) causing it to pivot about the rockshaft (96) to lower the pivotal connection points (106) and (108) with respect to the pivotal connection (35) and the rockshaft (96). An upward force is thereby applied to the pivotal connection (35) to raise the front section (22) as the rear section (14) is raised.

A linkage mechanism (110) is provided to maintain the hitch plate (31) substantially parallel to the frame (12). The linkage mechanism (110) includes a strap (112) pivotally attached to and interconnecting the front section (22) of the frame (12) and an ear (114) extending up from the plate (31). The pivotal connection points (116 and 118), the pivotal connection (33), and the pivotal connection (35) are the pivots of a second four-bar linkage. As the front section (22) of the frame (12) is raised or lowered with respect to the hitch (30), the hitch plate (31) maintains its parallel orientation with respect to the frame (12) and minimizes stress on the attached tractor drawbar.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A tillage tool comprising:

a frame having a front and a rear;

ground wheel means attached to and disposed to support said frame above a ground level;

means for moving said ground wheel means relative to said frame to move said frame between a raised position and a lowered position;

tongue means having one end pivotally connected to the front of said frame and having an opposite forward end adapted to be connected to a prime mover;

leveling means interconnecting said ground wheel means, said frame, and said tongue means, said leveling means operable to maintain said frame in a substantially level position as said frame is moved between said positions; and further wherein the front of said frame supports a row of disc gangs, the rear of said frame supports a row of residue mixing discs, and a row of deep tillage points is supported on said frame intermediate said rows of disc gangs and residue mixing discs, further including single control means for simultaneously raising or lowering the row of disc gangs and the row of residue mixing discs with respect to the frame, wherein said control means includes a connecting link disposed above and extended over said deep tillage points and operably attached to and interconnecting the row of disc gangs and the row of residue mixing discs.

2. The tillage tool of claim 1, and further wherein means for raising and lowering said row of residue mixing discs is mounted at the rear of said frame and to which said connecting link is operably connected.

* * * * *